F. KRUSE AND J. ODORFER.
ATTACHMENT FOR TALKING MACHINES.
APPLICATION FILED AUG. 15, 1919.

1,380,811.

Patented June 7, 1921.
5 SHEETS—SHEET 1.

Inventors
Ferdinand Kruse
John Odorfer
By their Attorney

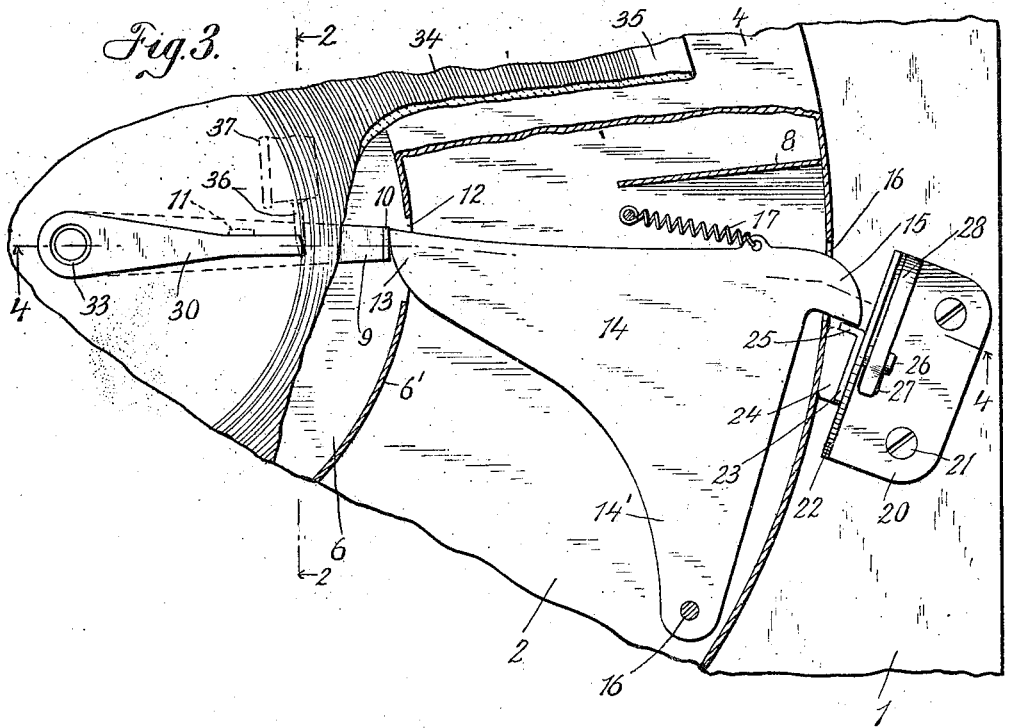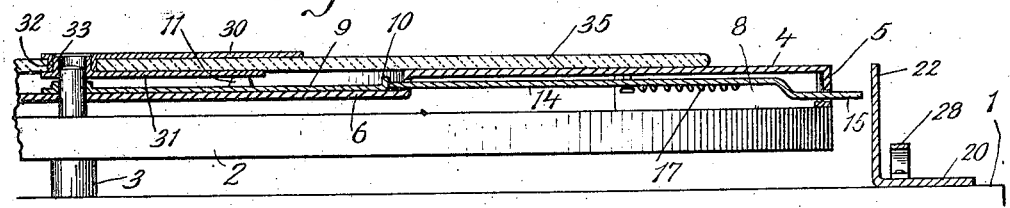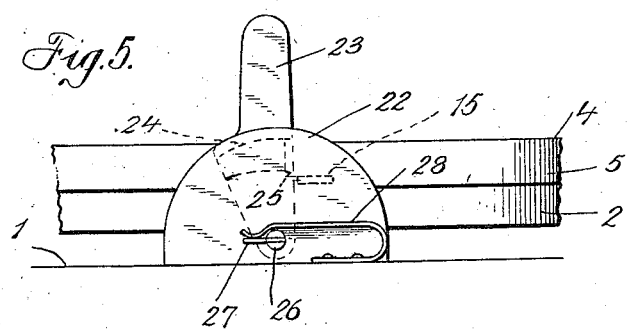

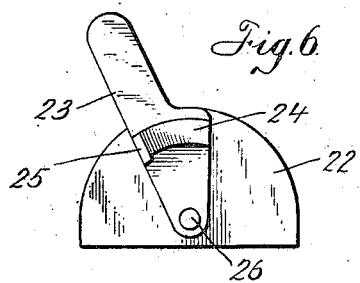
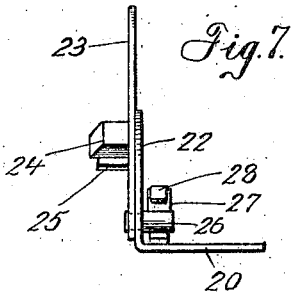
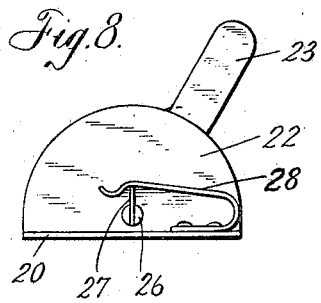
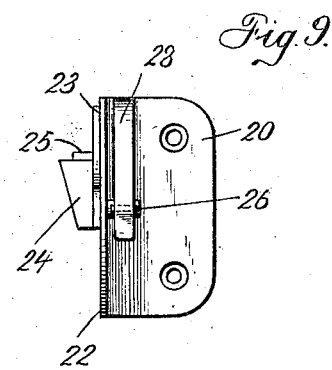
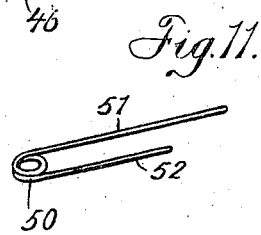

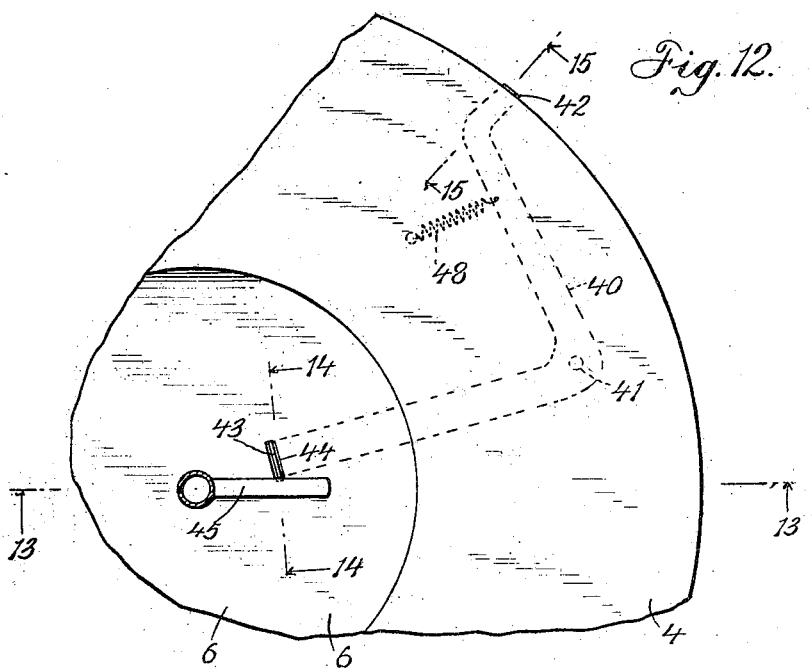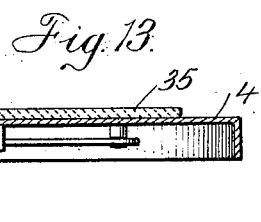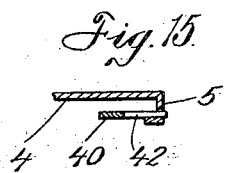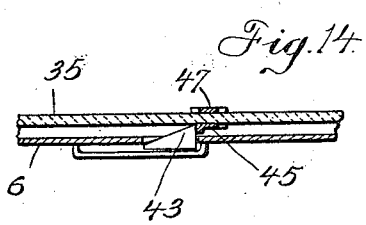

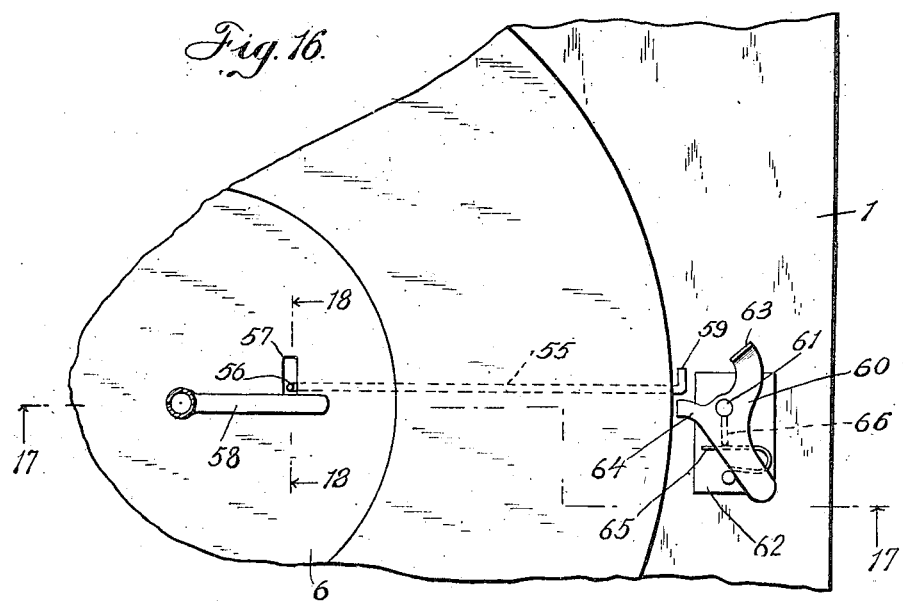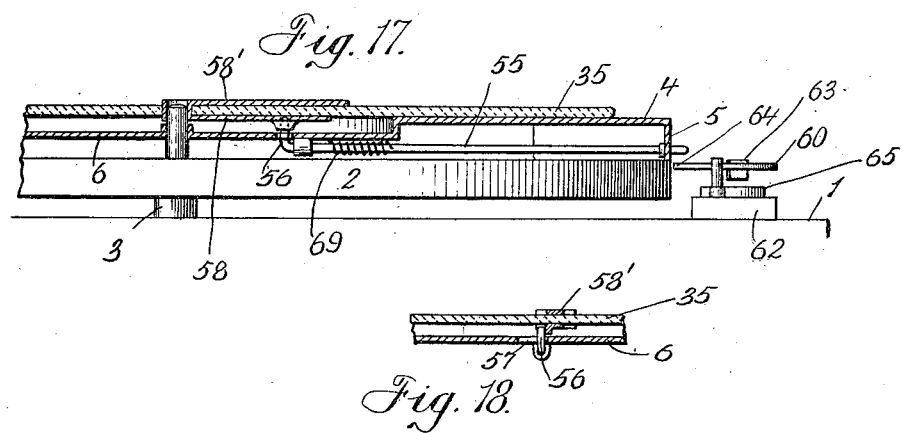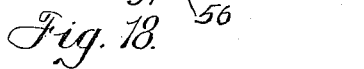

UNITED STATES PATENT OFFICE.

FERDINAND KRUSE, OF NEW YORK, AND JOHN ODORFER, OF BROOKLYN, NEW YORK.

ATTACHMENT FOR TALKING-MACHINES.

1,380,811.  Specification of Letters Patent.  Patented June 7, 1921.

Application filed August 15, 1919. Serial No. 317,640.

*To all whom it may concern:*

Be it known that I, FERDINAND KRUSE, a citizen of the United States, residing at New York, county of New York, and State of New York, and I, JOHN ODORFER, a citizen of the United States, residing at Brooklyn, county of Kings, and State of New York, have invented certain new and useful Improvements in Attachments for Talking-Machines, of which the following is a specification.

This invention relates to an attachment for talking machines of the disk record type, having more particular reference to an automatic device for stopping the machine when the needle or stylus has reached the end of the sound grooves on the record.

The invention has for objects to provide a novel and improved device of this kind which is inexpensive to construct and which may readily be applied to any ordinary type of disk record machine.

The invention also has for an object to provide an improved turntable brake which may operate in conjunction with the automatic mechanism or may be applied independently of the latter as may be desired.

For further comprehension of the invention, and of the objects and advantage thereof, reference will be had to the following description and accompanying drawings, and to the appended claims in which the various novel features of the invention are more particularly set forth.

Figure 1 of the drawings is a plan view of our improved attachment, the record not being shown.

Fig. 3 is a fragmentary plan view with certain parts broken away showing the attachment in position on a talking machine.

Fig. 4 is a vertical section on the line 4—4 of Fig. 3.

Fig. 5 is a detail side view showing the brake in its applied position.

Fig. 6 is a face view of the brake.

Fig. 7 is a side view thereof.

Fig. 8 is a rear view thereof.

Fig. 9 is a plan view thereof.

Fig. 10 is a detail perspective view illustrating a modified way of constructing the member carried by the disk.

Fig. 11 is a similar view illustrating another modified way of constructing this member.

Fig. 12 is a fragmentary plan view showing a modified form of the device.

Fig. 13 is a section on the line 13—13 of Fig. 12.

Fig. 14 is a detail section on the line 14—14 of Fig. 12.

Fig. 15 is a detail section on the line 15—15 of Fig. 12.

Fig. 16 is a similar view to Fig. 12 showing a different modification.

Fig. 17 is a section on the line 17—17 of Fig. 16.

Fig. 18 is a detail section on the line 18—18 of Fig. 16.

Figure 1:
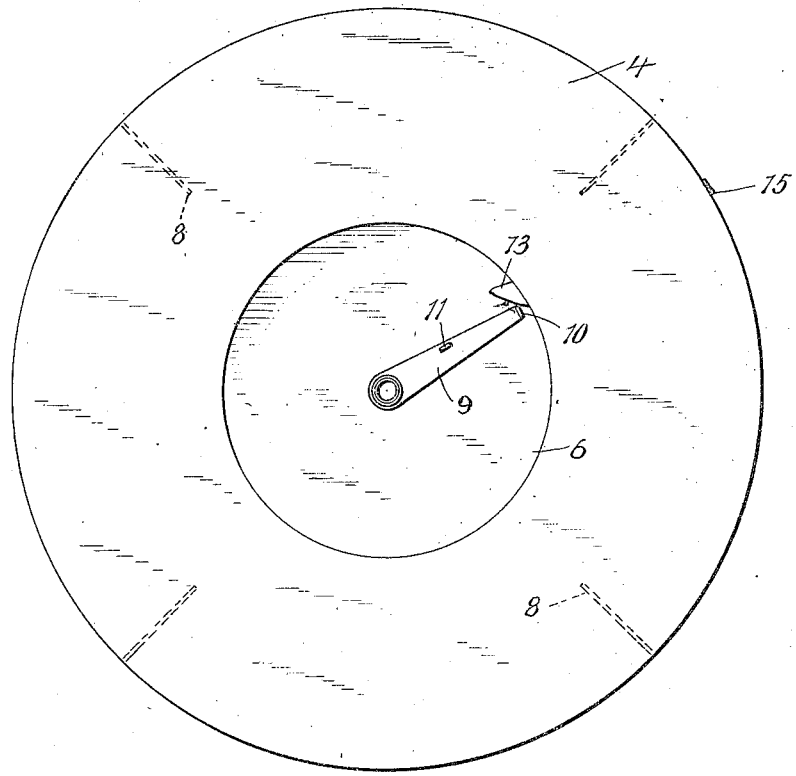

In the drawings 1 indicates the top of the mechanism cabinet of a disk talking machine of any ordinary type, and 2 the usual turntable carried on the central shaft 3.

As here shown our improved attachment comprises a disk 4 of the same diameter as the turntable, which may conveniently be made of pressed metal with a peripheral depending flange 5 and a central aperture which fits snugly over the end of the shaft 3, the central portion of the disk being depressed below the outer portion as at 6. A series of ribs 8, whose lower edges are flush with the bottom of flange 5, are formed on the under side of the disk and extend radially inwardly from said flange and serve as a support whereby the disk is supported upon the turntable. While it is preferable to make the disk 4 of a diameter corresponding to some standard size of turntable, exact correspondence in size is not essential.

A movable arm 9 is located in the depressed portion of the disk, being pivoted at one end upon the shaft 3, this arm having its free end upturned as at 10 and having a lug 11 struck up therefrom at a distance from this end.

The upturned end 10 is located adjacent to side wall 6' of the depressed portion 6 and this side wall is horizontally slotted as at 12 to receive the inner end 13 of a movable bar 14, this end being in the form of a cam adapted to be engaged by the element 10, the opposite end of the bar being substantially in radial alinement with the end 13 and being in the form of a finger 15 which projects through a slot 16 in the flange 5 and is adapted to operate the brake as will be later pointed out. The bar 14 is here movably mounted by being provided with an angular offset 14' pivoted as at 16 to the under side of the disk 4. A tension spring 17 connected at one end to the under side of the disk and at its opposite end to the bar 14, serves to normally retain the latter with the hook 15 in inoperative position, in which position the cam 13 projects into the circumferential line of the upturned end 10 this being the position shown in Fig. 1.

The stop or brake which we have devised comprises a bracket 20 adapted to be secured as by screws 21 to the top 1 of the cabinet and having a vertical flange 22 of semi-circular outline to which is pivoted an arm 23 having fixed thereto in any suitable manner a rubber pad 24 having an inclined outer face, a lug 25 projecting outwardly from the arm behind the pad. The arm 23 is fixed upon one end of a pintle 26 suitably journaled in the flange 22, this pintle having on its opposite end a laterally projecting cam finger 27 while a flat spring 28 secured to the bracket 20 and is adapted to press inwardly against the end of the finger 27, as in Fig. 8, to yieldingly hold the arm 25 in inoperative position, this spring bearing against the side of the finger and acting to throw the arm forward when the latter has received an initial movement sufficient to move the finger 27 from the vertical position shown in Fig. 8.

To effect an operative connection between these parts and the stylus or sound box, we provide a device carried by the record and comprising a pair of arms 30 and 31 one of which extends along the top face of the record and the other along the bottom face of the record in the depression 6, these arms being united together by a hub-like element which is rotatably positioned in the central aperture with which all disk records are provided. In the modification shown in Figs. 1 and 2 this hub-like element is constituted partly by a downturned annular flange 32 at one end of the arm 30 adapted to fit in the record aperture, and the arm 31 is formed with an upturned annular flange 33 on the end of the arm 31 which fits with considerable frictional hold in the flange 32, the height of these flanges being equal to the thickness of the record.

Figure 2:
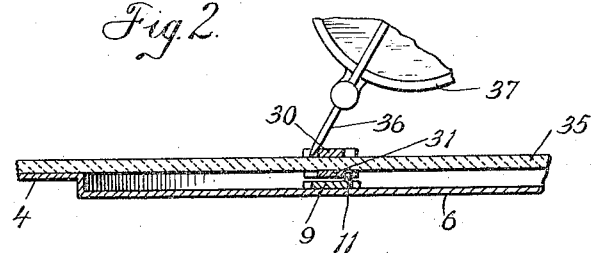
Fig. 2 is an enlarged detail section showing the manner in which the sound box needle engages the arm carried by the record to operate the brake, this view being taken on the line 2—2 of Fig. 3.

The arm 31 is adapted to engage the lug 11, while the arm 30 is of a length to extend to the inner ones of the record lines, indicated at 34, of the record 35, so as to be engaged by the needle of the sound box when the latter reaches the end of the record, these inner lines representing the end of the record as is well understood. In Figs. 2 and 3 we have indicated the needle at 36 and a portion of the sound box at 37, with the needle just engaging the arm 30.

The manner of operation of our attachment is as follows: While the record is being played the whole attachment, including the arms 9, 30 and 31, revolves with the turntable 2, the finger 15 passing freely the lug 25 on the brake arm 23. When the needle 36 reaches the end of the record it crosses the circular path of movement of the end of arm 30, and, engaging the latter as shown in Figs. 2 and 3, prevents its continued rotation with the record. The motion of arms 30 and 31 being arrested, the arm 9 continues moving with the record until the lug 11 thereon engages arm 31 causing this arm to stop moving also and, as the turntable continues rotating, the cam 13 moves against the end 10 of arm 9 and is swung outward, causing the finger 15 to project from the flange 5 and engage the lug 25 of the brake, swinging the pad 24 forward and causing it to wedge against the flange 5 and stop the machine.

As shown in Fig. 5 the inner end of lug 25 is so arranged with respect to the finger 15 that it rises above the latter when the brake is applied to give the required clearance for the detent, the action of spring 28 on cam 27 throwing the arm forward once the cam has been moved from its vertical position.

Since the spring 17 automatically retracts the finger as soon as cam 13 disengages from the end 10 of the arm 9 it is to be noted that the brake must be so positioned as to cause the detent 15 to engage lug 25 immediately upon its being moved outward as otherwise the finger would move inward again before the brake operated.

In Figs. 10, 12, 13, 14 and 15 we have shown a modified form of the device in which a bell-crank lever 40 is pivoted as at 41 to the under side of the disk 4 and has one end 42 adapted to operate similarly to the finger 15, the opposite end 43 projecting upwardly through a vertical slot 44 in the disk to be engaged by an arm 45 corresponding to the arm 31, and which is united by a split sleeve 46 with an arm 47 corresponding to the arm 30, this member being shown in detail in Fig. 10. A spring 48 retains the lever normally in the position shown. The upper edge of the end 43 of the lever 40 is beveled from side to side as shown and is adapted to ride under the end wall of the slot 44 when engaged by the arm 45.

In Fig. 11 we have shown another way of constructing the member carried by the record, it being here made from a single length of wire bent to form an intermediate loop 50, which is positioned in the disk aperture, and having its ends 51 and 52 projecting respectively over and under the record. The devices shown in Figs. 10 and 11 may be inserted in the record by previously bending one of the arms vertically for insertion in the record aperture, the arm being then bent to extend along the face of the record.

In Figs. 16 to 18, we have shown a further modification in which a rod 55 is rotatably mounted on the underside of the disk 4 and has its inner end 56 normally upturned through a slot 57 in the disk to be engaged by an arm 58 united with an arm 58', the opposite end of the rod 55 projecting through the flange 5 of the disk and being bent at right angles as at 59 to extend normally horizontally. The brake here comprises a member 60 pivoted on a vertical axis as at 61 on a block 62 fixed to the top of the cabinet, this member being formed with a shoe 63 adapted to engage the side of the turntable 2, and a finger 64 adapted to be engaged by the end 59 of the rod 55 when the latter is swung downwardly from normal position. A flat spring 65 which bears on a cam strip 66 carried by the member 60 holds the latter in either operative or inoperative position. A spring 69, coiled about the rod 55 and connected at one end to the latter and at its opposite end to the disk, serves to retain the rod normally in the position shown.

While we have here shown our improved automatic stop in the form of a separate attachment it will be understood that the same may be applied to the turntable of the machine to form a permanent part of the latter, it being apparent that the turntable could be readily arranged similarly to the disk to hold the operating parts.

Claims:

1. An attachment for talking machines comprising a disk adapted to be rotated by the talking machine mechanism, said disk being adapted to support a record, a brake, and means including an element adapted to be carried by said record independently of the said disk, whereby the said brake is operated by the sound reproducing device of the talking machine.

2. An attachment for talking machines comprising a disk adapted to be rotated by the talking machine mechanism and to support a record, a device carried by said record independently of the said disk and including a pair of arms extending across the record respectively above and below the latter, and a hub-like element on which said arms are fixed pivotally carried by the record centrally thereof, the upper one of said arms being adapted to be engaged and stopped by the sound reproducing device of the talking machine when it reaches the end of the record grooves, a brake, and means coöperating with the lower arm whereby continued rotation of the said disk causes the brake to be actuated.

3. An attachment for talking machines comprising a disk adapted to be rotated by the talking machine mechanism and to support a record, a device carried by said record independently of the said disk and including a pair of arms extending across the record respectively above and below the latter, and a hub-like element on which said arms are fixed pivotally carried by the record centrally thereof, the upper one of said arms being adapted to be engaged and stopped by the sound reproducing device of the talking machine when it reaches the end of the record grooves, a brake, and means coöperating with the lower arm whereby continued rotation of the said disk causes the brake to be actuated, said means including a pivoted arm having one part thereof in the form of a cam and a second part formed to engage and throw the brake.

4. An attachment for talking machines comprising a disk adapted to be rotated by the talking machine mechanism and to support a record, said disk having a central depression, a device carried by said record and including a pair of arms extending respectively above and below the record, said arms being united together centrally of the record and normally moving therewith but being capable of swinging movement thereon, the lower one of said arms being located in the said depression, the upper one of said arms being adapted to be engaged and stopped by the sound reproducing device of the talking machine when it reaches the end of the record grooves, a brake, and means coöperating with the lower arm whereby the continued rotation of the disk causes the brake to be actuated.

5. An attachment for talking machines comprising a disk adapted to be rotated by the talking machine mechanism and to support a record, said disk having a central depression, a device carried by said record and including a pair of arms extending respectively above and below the record, said arms being united together centrally of the record and normally moving therewith but being capable of swinging movement thereon, the lower one of said arms being located in the said depression, the upper one of said arms being adapted to be engaged and stopped by the sound reproducing device of the talking machine when it reaches the end of the record grooves, a brake, and means coöperating with the lower arm whereby the continued rotation of the disk causes the brake to be actuated, said means including a third arm pivoted eccentrically of the disk and adapted to be engaged by the said lower arm.

6. An attachment for talking machines comprising a disk adapted to be rotated by the talking machine mechanism and to support a record, said disk having a central depression, a device carried by said record and including a pair of arms extending respectively above and below the record, said arms being united together centrally of the record and normally moving therewith but being capable of swinging movement thereon, the lower one of said arms being located in the said depression, the upper one of said arms being adapted to be engaged and stopped by the sound reproducing device of the talking machine when it reaches the end of the record grooves, a brake, and means coöperating with the lower arm whereby the continued rotation of the disk causes the brake to be actuated, said means including a third arm pivoted eccentrically of the disk and adapted to be engaged by the said lower arm, said means also including a brake pivoted on the underside of the said disk and having a cam surface adapted to be engaged by the last mentioned arm and a part adapted to throw the brake.

7. An attachment for talking machines comprising a disk adapted to be rotated by the talking machine mechanism and to support a record, a pivoted brake arranged adjacent the periphery of said disk, an element adapted to project from the periphery of said disk to set said brake, and means operated by the sound reproducing device of the talking machine, for moving said device to position to set said brake.

8. A brake for talking machines comprising a bracket having a vertical flange adapted to be set adjacent and at an inclination to the side of the turntable of the machine, and a shoe carried by said flange and adapted to be wedged between the said flange and the side of the turntable.

9. An attachment for talking machines comprising a disk adapted to be rotated by the talking machine mechanism, a brake adjacent said disk comprising a vertical flange adapted to be set at an inclination to the side of the turntable of the machine and a shoe carried by said flange and slidable along the latter, and means carried by said disk for causing said shoe to be moved to operative position along said flange.

10. In an attachment for talking machines of the class described, a device adapted to operate a brake, and means adapted for mounting on a talking machine record independently of the motive mechanism of the machine for actuating said device at a selected time.

In testimony whereof we have affixed our signatures.

FERDINAND KRUSE.
JOHN ODORFER.